(12) United States Patent
Schmitz et al.

(10) Patent No.: US 12,033,442 B2
(45) Date of Patent: Jul. 9, 2024

(54) TESTING SYSTEM FOR MEASURING TARGET OPERATIONAL PARAMETERS OF A MOTOR VEHICLE

(71) Applicant: A & E INCORPORATED, Racine, WI (US)

(72) Inventors: James Schmitz, Milwaukee, WI (US); Jason Horner, Burlington, WI (US)

(73) Assignee: A & E INCORPORATED, Racine, WI (US)

( * ) Notice: Subject to any disclaimer, the term of this patent is extended or adjusted under 35 U.S.C. 154(b) by 524 days.

(21) Appl. No.: 17/205,811

(22) Filed: Mar. 18, 2021

(65) Prior Publication Data

US 2022/0301366 A1 Sep. 22, 2022

(51) Int. Cl.
| *G01M 15/05* | (2006.01) |
| *G01L 19/08* | (2006.01) |
| *G01L 19/12* | (2006.01) |
| *G07C 5/00* | (2006.01) |
| *G07C 5/08* | (2006.01) |

(52) U.S. Cl.
CPC .......... *G07C 5/0808* (2013.01); *G01L 19/083* (2013.01); *G01L 19/12* (2013.01); *G07C 5/004* (2013.01); *G07C 5/008* (2013.01); *G07C 5/0825* (2013.01)

(58) Field of Classification Search
CPC ....... G01L 19/083; G01L 19/12; G07C 5/004; G07C 5/008; G07C 5/0808; G07C 5/0825
See application file for complete search history.

(56) References Cited

U.S. PATENT DOCUMENTS

| 5,875,413 A | 2/1999 | Vinci |
| 10,620,076 B2 | 4/2020 | Knooil et al. |
| 2005/0150282 A1 | 7/2005 | Andreasen et al. |
| 2011/0029146 A1 | 2/2011 | Muller et al. |
| 2012/0109544 A1 | 5/2012 | Fish et al. |
| 2014/0350752 A1 | 11/2014 | Gelinske |
| 2016/0209095 A1 | 7/2016 | Parker et al. |

FOREIGN PATENT DOCUMENTS

| CA | 2935592 | 7/2015 |
| EP | 0685723 | 12/1995 |
| WO | WO2015/109278 | 7/2015 |

OTHER PUBLICATIONS

Search Report dated Mar. 29, 2018 from EP17206047.7.
Hickok/Waekon; PressureProPC product brochure; 2013.
Parker Hannifin Corporation, Sporlan Division, product brochure Form 140-415/0914; 2014.
Steelman 97202 Wireless ChassisEAR Diagnostic Device Kit; web page, accessed Jan. 9, 2018.

*Primary Examiner* — Eric S. McCall
(74) *Attorney, Agent, or Firm* — RYAN KROMHOLZ & MANION, S.C.

(57) ABSTRACT

A pressure measuring device/system that is capable of measuring the pressures of multiple systems in an automobile, including fuel pressure, power steering, engine oil pressure, transmission oil pressure, compression, diesel compression, high pressure oil systems, and diesel fuel pressure, and is capable of displaying and/or recording the measured pressure values. An onboard digital display receives a series of signals from a transducer and displays the series of signals as at least one of a digital needle gauge and a live graph display, and selectively displays the series of signals in a chart with two axes, one for signal and one for time.

13 Claims, 3 Drawing Sheets

TESTING SYSTEM FOR MEASURING TARGET OPERATIONAL PARAMETERS OF A MOTOR VEHICLE

BACKGROUND OF THE INVENTION

Pressure measuring tools, particularly pressure measuring tools for automotive use, are known in the art. Generally, individual pressure measuring devices are needed for measuring each of fuel pressure, power steering, engine oil pressure, transmission oil pressure, compression, diesel compression, high pressure oil systems, and diesel fuel pressure. Each of these systems has its own range of pressures (e.g., 0-100 psi for fuel pressure, 0-2000 psi for power steering) so that a single pressure measuring device is impractical.

Accordingly, the art of pressure measuring devices would benefit from a pressure measuring device/system that is capable of measuring the pressures of multiple systems in an automobile (or in other environments, such as an industrial or manufacturing environment) and one that is capable of displaying, charting, and/or recording the measured pressure values.

Systems in the prior art of wired pressure testers sometimes require an independent computer to view data, or require a multimeter to view data. Other pressure testers cannot record data, and only display live data and min/max values.

Typical prior art pressure testers have a hose extending from a pressure gauge to the application. That hose contains a fluid which must be emptied after each test. In the present invention, an adapter is coupled directly to a transducer to minimize fluid captured compared to the prior art.

SUMMARY OF THE INVENTION

The wired pressure tester is a handheld and portable digital automotive pressure gauge. It was designed to replace the analog gauges that are featured in many diagnostic test kits. The present invention relates to a pressure measuring device/system that is capable of measuring the pressures of multiple systems in an automobile, including cylinder pressure, fuel pressure, transmission oil pressure, and engine oil pressure, and is capable of displaying and/or recording the measured pressure values, and log the data.

The present invention is a handheld and portable digital automotive pressure gauge. It provides a more accurate reading with the ability to record diagnostic tests and replay them for further analysis. This allows for road tests that avoid having the mechanic be distracted from trying to read an analog gauge.

The pressure measuring system comprises a pressure measuring sensor configured to communicate with an onboard computer.

A technician can record data from real time operating conditions as a vehicle is driven down the road. This is advantageous because oftentimes operating conditions cannot be duplicated in a bay of a service center. A sensor is deployed, and using couplings to an engine, the engine can be monitored on the fly.

The wired pressure tester uses a length of cable to connect to a handheld device that displays and logs the pressure readings. The device can use different transducers (e.g., 300, 1000, and 5000 psi). The unit has a slot for data storage (such as a microSD card) which allows for recording and playback of various tests. Unit can track the minimum and maximum recorded data points. In a preferred embodiment, sample rates of ~12 samples per second are taken and stored. Applications and uses include testing for:

Fuel Pressure (0-100 psi)
Power Steering (0-2000 psi)
Engine Oil Pressure (0-200 psi)
Transmission Pressure (0-400 psi)
Compression (0-300 psi)
Diesel Compression (0-1000 psi)
High Pressure Oil Systems (0-5000 psi)
Diesel Fuel Pressure (0-100 psi)

Additional features of the present invention are an ability to choose between digital needle gauge or a live graph display, automatic tracking of Min/Max values with ability to reset them, 1% full scale accuracy with transducers, minimal length of hose reduces fluid lost, choice of pressure range, the ability to easily add length to wire for more remote readings, and that recordings are saved (e.g., to a microSD card) which can be used to easily import the data for post processing.

Disclosed is a testing system for measuring target operational parameters of a motor vehicle, the testing system comprising a housing; a communicative coupling carried by said housing; one of a series of transducers selectively carried by said communicative coupling, said series of transducers comprising a lower pressure transducer, a medium pressure transducer, and a higher pressure transducer; one of said transducers coupled to a targeted operational parameter of said motor vehicle, said targeted operational parameter comprising at least one of fuel pressure, power steering, engine oil pressure, transmission oil pressure, compression, diesel compression, high pressure oil systems, and diesel fuel pressure; a user interface carried by said housing; a series of signals sent from said transducer to a digital display, said digital display carried by said housing and communicatively coupled to said user interface; said digital display receiving said series of signals, displaying one of said series of signals as at least one of a digital needle gauge and a live graph display, and selectively displaying said series of signals in a chart with one axis of said chart comprising said signal and another axis of said chart comprising time; said housing carrying a digital storage medium, said digital storage medium logging said series of signals, saving said series of signals, and communicating said series of signals to said digital display.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
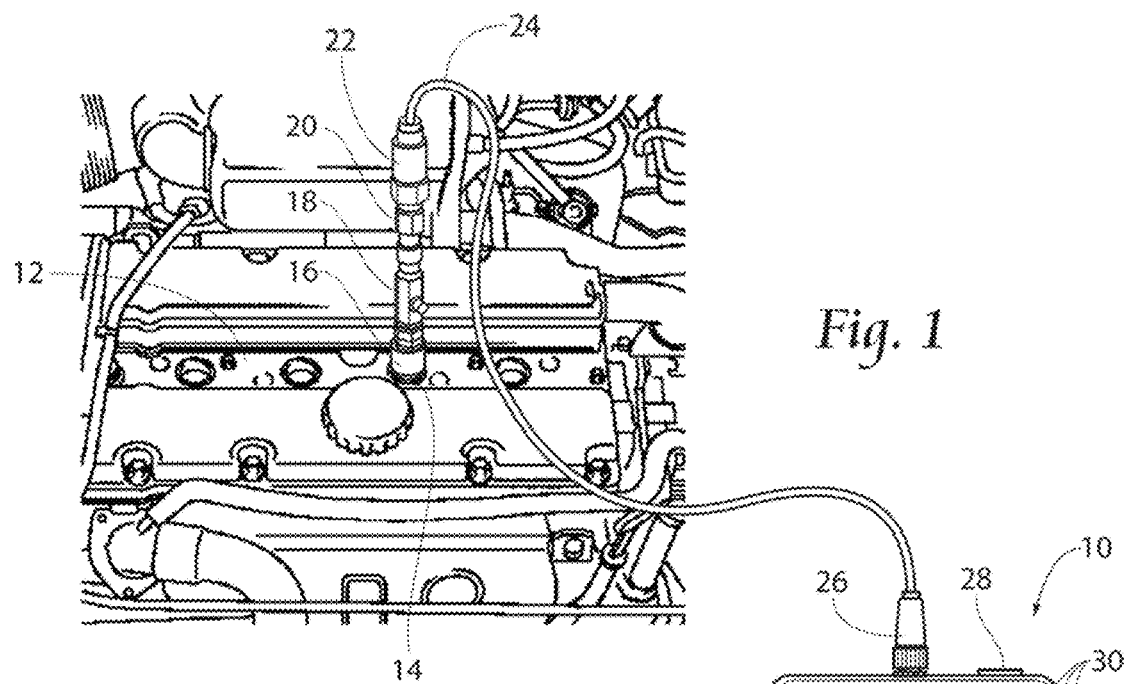
FIG. 1 illustrates a system comprising the pressure measuring sensor coupled to and monitoring an engine, and communicating with a remote interface device.

The present invention is directed to vehicle monitoring systems, which can for instance be used to measure pressures in automotive/transportation applications. Referring now to FIG. 1, a targeted component of an automotive/transportation system is monitored, such as a spark plug hole 14 on a cylinder head 12. Handheld pressure testing display and command unit 10 is coupled to the targeted component. An adaptor 16 is coupled to spark plug hole 14 (or other targeted component, such as the Fuel Pressure (0-100 psi), Power Steering (0-2000 psi), Engine Oil Pressure (0-100 psi), Transmission Pressure (0-400 psi), Compression (0-300 psi), Diesel Compression (0-1000 psi), High Pressure Oil Systems (0-5000 psi), or Diesel Fuel Pressure (0-100 psi)). If necessary, a bleeder 18 is carried by adaptor 16. An additional adaptor 20 is provided, which carries transducer 22. Transducer 22 is chosen from a supplied series of transducers, appropriate for measuring relatively lower pressures (e.g., fuel pressure at 0-100 psi), medium pressures (e.g., diesel compression at 0-1000 psi), and high pressures (e.g., high pressure oil systems at 0-5000 psi). The appropriate transducer is chosen in order to provide the most accurate readings possible for the chosen parameter.

Transducer 22 is interchangeably coupled with data cable 24. Data cable 24 is preferably a length at least extend from an engine compartment of a vehicle to the interior passenger compartment of the vehicle. Male coupling 26 of the data cable 24 couples the data cable with the handheld pressure testing display and command unit 10.

Figure 2:
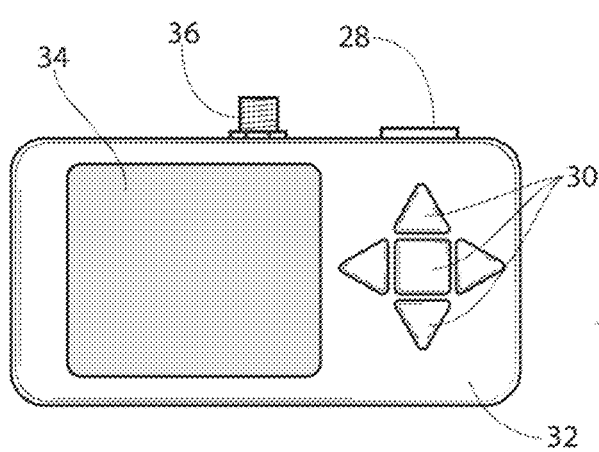
FIG. 2 is a front view of the pressure measuring sensor shown in FIG. 1.
Figure 3:
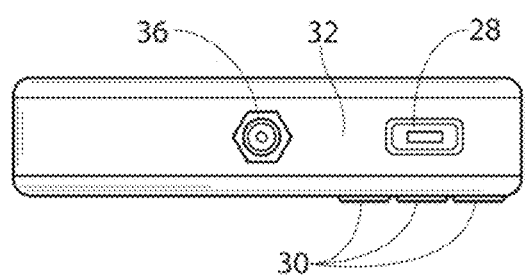
FIG. 3 is a top view of the pressure measuring sensor shown in FIG. 1.
Figure 4:
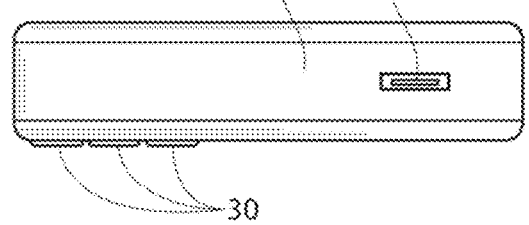
FIG. 4 is a bottom plan view of the pressure measuring sensor shown in FIG. 1.

Turning to FIGS. 2-4 handheld pressure testing display and command unit 10 is shown disconnected from the targeted component. A housing 32 carries components of the handheld pressure testing display and command unit 10. Female coupling 36 receives male coupling 26 from data cable 24 (FIG. 1). A series of command buttons 30 are provided to operate the handheld pressure testing display and command unit 10 through the commands and menu system provided, as will be described later. Display 34 is provided. Power switch 28 is carried by the housing 32. Data card slot 38 is provided to carry a data card, such as an SD or MicroSD card for saving test data.

Figure 5:
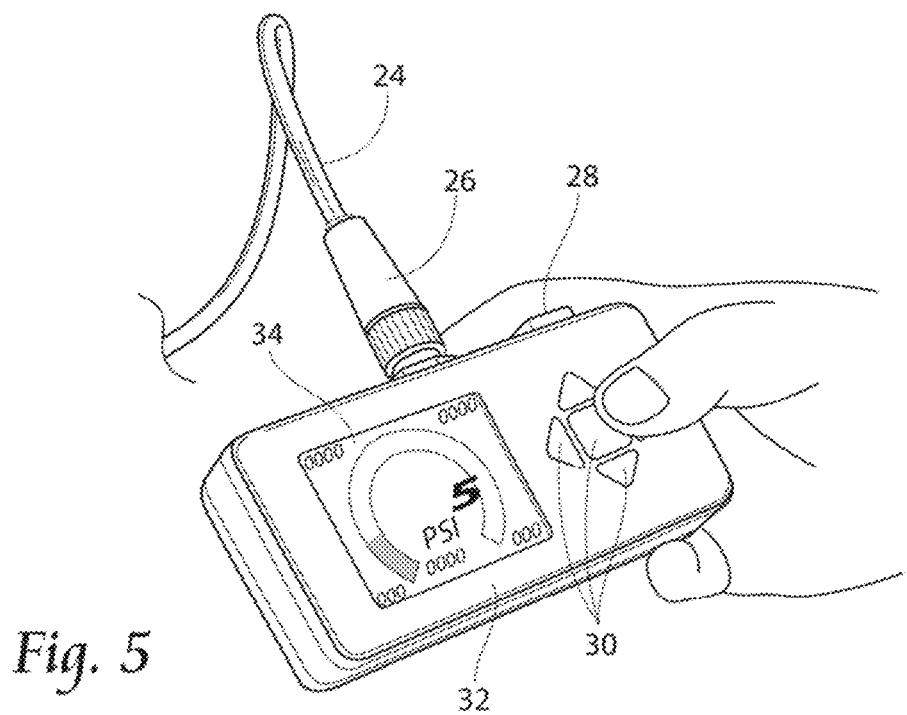
FIG. 5 is a perspective in use view of a pressure measuring sensor of the present invention.
Figure 6:
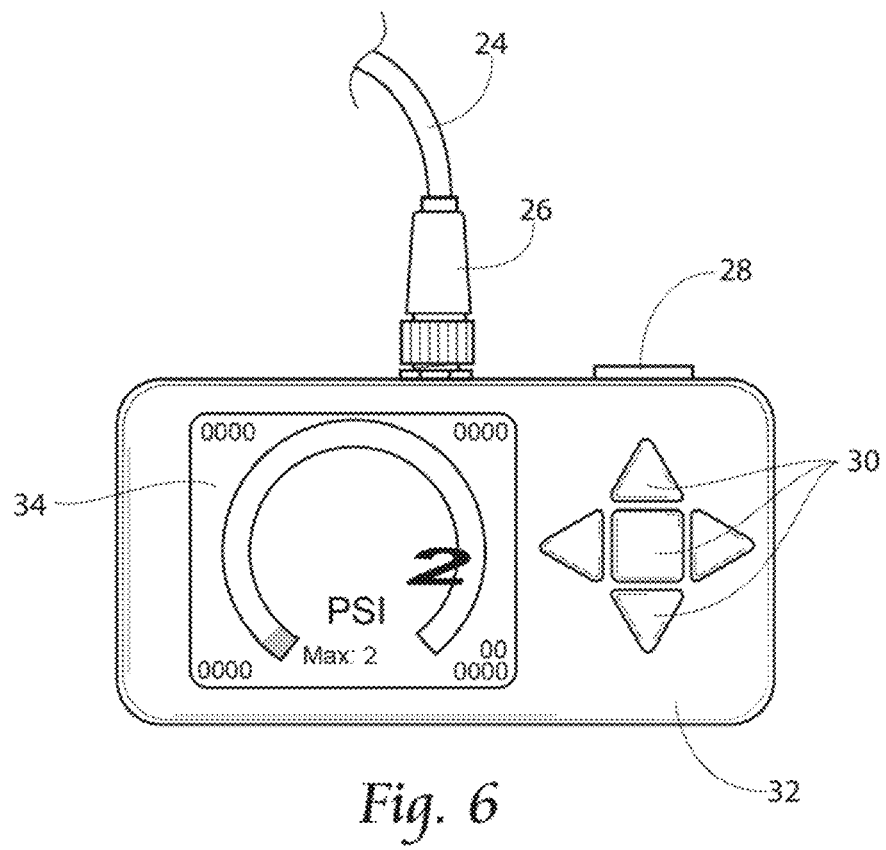
FIG. 6 is a front in use view of a pressure measuring sensor according to the present invention.
Figure 7:
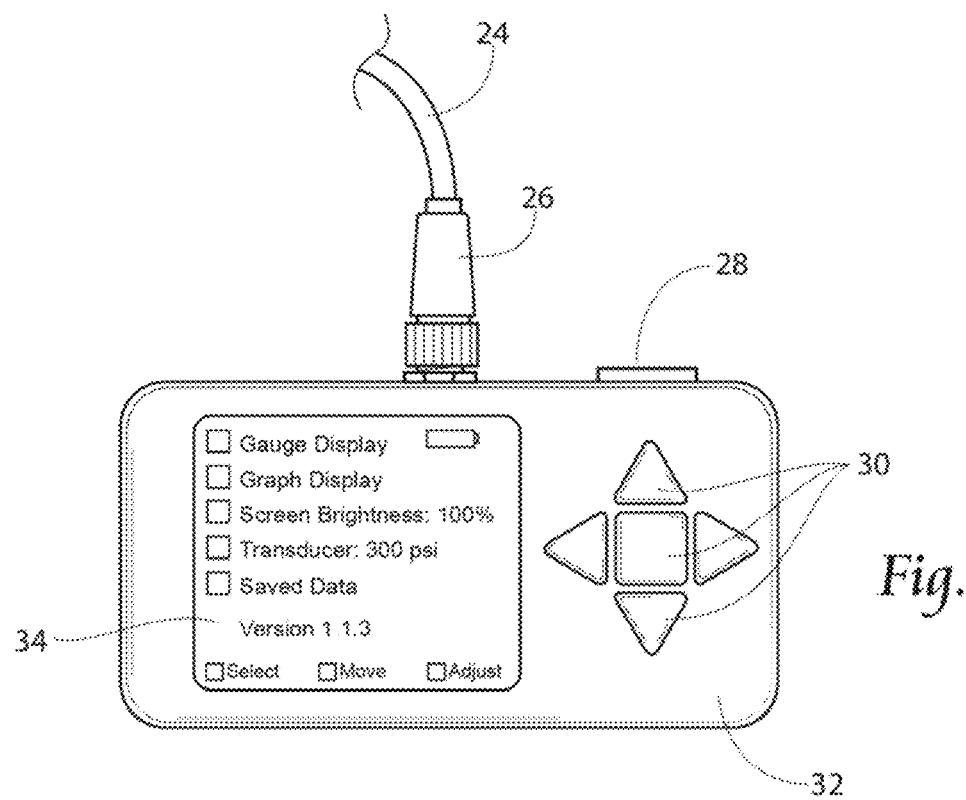
FIG. 7 is a front in use view of a menu screen of pressure measuring sensor according to the present invention.
Figure 8:
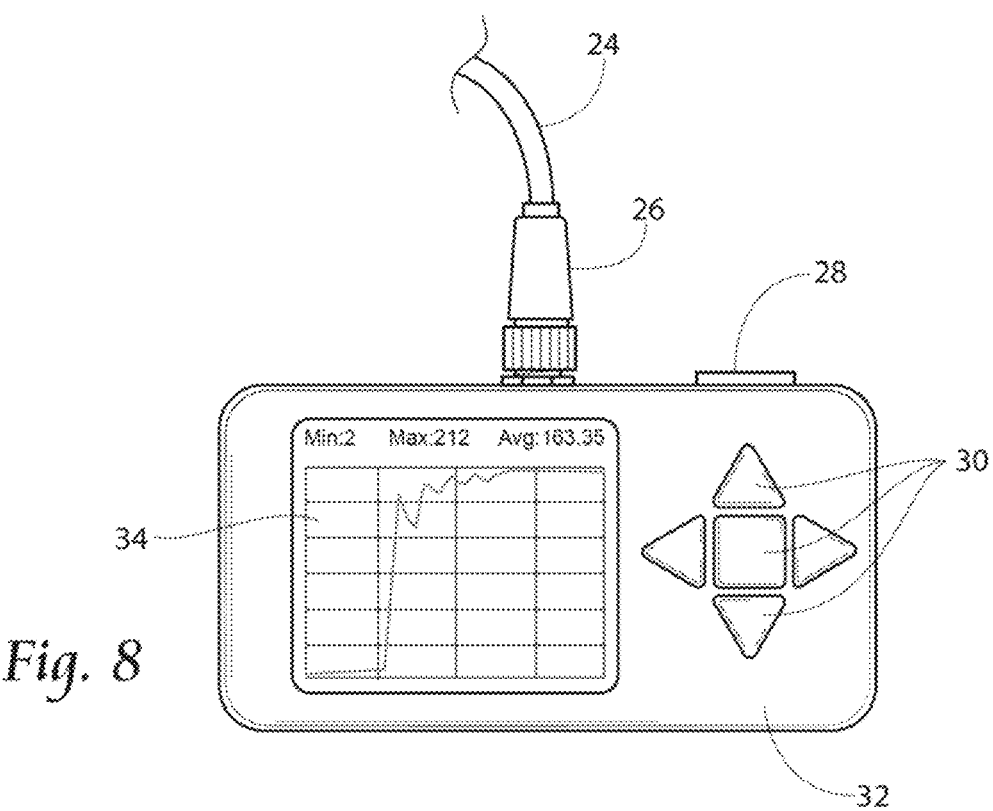
FIG. 8 is a front in use view of a data charting feature of the pressure measuring sensor according to the present invention.

Turning to FIGS. 5 and 6, one display screen is shown on display 34. In this configuration, gauge display 34 is displaying real time readout of pressure from the targeted accessory. Referring now to FIG. 7, a menu tree is provided to control handheld pressure testing display and command unit 10. User options include gauge display or graph display, screen brightness, transducer identification, and a choice to view saved data. Referring to FIGS. 1 and 8, the following example of the handheld pressure testing display and command unit 10 in use is provided as it pertains to a method for measuring cylinder pressure. It is preferable that the fuel delivery system is disengaged and the coil (not shown) is disconnected. Remove all spark plugs (not shown) from their respective spark plug hole 14 in the cylinder head 12 and couple the adaptor 16 with the spark plug hole 14. The engine 10 is turned over and the pressure transducer 22 measures the pressure formed within the engine cylinder for at least a complete intake-compression-ignition-exhaust cycle, preferably more than one complete cycle. The pressure measurements are transmitted to the handheld pressure testing display and command unit 10. It is contemplated that the cylinder pressure for the at least one intake-compression-ignition-exhaust cycle may be measured, transmitted, viewed on the display 34, and recorded for each cylinder. The measured pressure values for each cylinder are preferably saved for reference on a data card in data card slot 38. Logs are taken, in which recorded information as readings are taken, is saved and charted. Several logs can be recorded. From a list of sequential logs, each log can be opened and analyzed by a technician. From the log list, the logs can be exported, for instance by email in formats such as jpg, png, csv, .txt file into excel, and provided with a summary.

Referring to further menu items, in a preferred embodiment these can be for: 1) Units—to switch measurement units (e.g., psi, in/Hg, kpA, mm/hg, or bars); 2) Cylinder—to allow a user to select how many cylinders the engine has; for instance, in a four cylinder engine, all four cylinders could be contained in log files. A Record button can be set to begin a test. A Graph button can bring up a test result graphical reading in real time. This data can ultimately be saved as the log.

Different adaptors 16 can be attached to different areas of inquiry in the vehicle. For instance, a fuel line, spark plug hole, or anywhere else in the vehicle of interest can receive the adaptor 16. A plurality of adaptors 16 can be provided; for instance, a standard fuel setup with pressure bleed off, which can work with different fuel adaptors; fuel injection; inline or direct port adaptors; or a Universal interchange connector. For compression, compression adaptors can be used, or units available from Lang Tools with SKU numbers 73106, 73109, 73110 for example, each of which is incorporated by reference.

Because the handheld pressure testing display and command unit 10 has a longer data cable 24 extending from the engine compartment to the passenger compartment of a vehicle, handheld pressure testing display and command unit 10 can receive data while the vehicle is running and/or underway. In this manner, readout of the handheld pressure testing display and command unit 10 is displayed at display 34, and can be logged or monitored. One advantage of the present invention is the ability to remotely read measurements from an interior of the vehicle engine compartment while the vehicle is underway.

The pressure measurements taken by the transducer are in an exemplary embodiment, taken in 12 readings per second intervals; however, smaller or larger intervals are also possible.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A testing system for measuring target operational parameters of a motor vehicle, the testing system comprising:
   a housing;
   a communicative coupling carried by said housing;
   a series of transducers comprising a lower pressure transducer with a first pressure upper limit, a medium pressure transducer with a second pressure upper limit greater than said first pressure upper limit, and a higher pressure transducer with a third pressure upper limit greater than said second pressure upper limit;

at least one of said lower pressure transducer, medium pressure transducer, and higher pressure transducer selectively coupled to said communicative coupling;

said transducer coupled to said communicative coupling coupled to a targeted operational parameter of said motor vehicle, said targeted operational parameter comprising at least one of fuel pressure, power steering pressure, engine oil pressure, transmission oil pressure, compression, high pressure oil pump pressure, and diesel fuel pressure;

a user interface carried by said housing;

a series of signals sent from said transducer carried by said communicative coupling to a digital display, said digital display carried by said housing and communicatively coupled to said user interface;

said digital display receiving said series of signals, displaying one of said series of signals as at least one of a digital needle gauge and a live graph display, and selectively displaying said series of signals in a chart with one axis of said chart comprising said signal and another axis of said chart comprising time;

said housing carrying a digital storage medium, said digital storage medium logging said series of signals, saving said series of signals, and communicating said series of signals to said digital display.

2. A testing system according to claim 1, said lower pressure transducer comprising a 0-300 psi transducer.

3. A testing system according to claim 1, said lower pressure transducer is coupled to a targeted operational parameter comprising fuel pressure.

4. A testing system according to claim 1, said medium pressure transducer comprises a 0-1000 psi transducer.

5. A testing system according to claim 1, said medium pressure transducer is coupled to a targeted operational parameter chosen from a group comprising transmission pressure and diesel engine compression.

6. A testing system according to claim 1, said higher pressure transducer comprises a 0-5000 psi transducer.

7. A testing system according to claim 1, said higher pressure transducer is coupled to a targeted operational parameter chosen from a group comprising power steering pressure and high pressure oil pump pressure.

8. A testing system according to claim 1, said series of signals generates a signal at a rate of at least about 10 signals per second.

9. A testing system according to claim 1, said series of signals generates signals for a time period of at least about 20 minutes.

10. A testing system according to claim 1, said user interface comprises a plurality of controls comprising switches for varying at least one of settings, units, modes, and number of cylinders.

11. A testing system according to claim 1, said lower pressure transducer is coupled to a targeted operational parameter comprising engine oil pressure.

12. A testing system according to claim 1, said lower pressure transducer is coupled to a targeted operational parameter comprising gasoline compression.

13. A testing system according to claim 1, said lower pressure transducer is coupled to a targeted operational parameter comprising diesel engine fuel pressure.

* * * * *